Sept. 10, 1935. H. E. McKEE 2,013,968
COUPLING FOR RELATIVELY ROTATABLE WHEEL AND AXLE
Filed Aug. 15, 1934
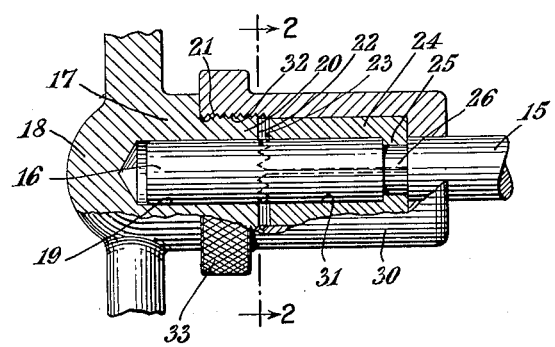
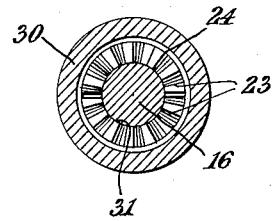
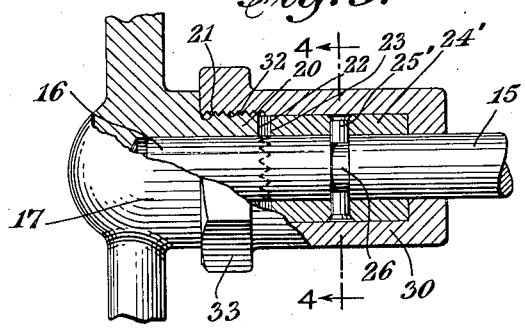
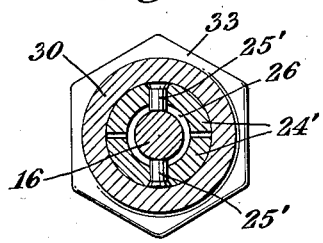
INVENTOR.
Harry E. McKee.
BY
Warren E. Willis.
his ATTORNEY.

Patented Sept. 10, 1935

2,013,968

UNITED STATES PATENT OFFICE 2,013,968

COUPLING FOR RELATIVELY ROTATABLE WHEEL AND AXLE

Harry E. McKee, Brooklyn, N. Y., assignor of one-half to William P. Guerin, Brooklyn, N. Y.

Application August 15, 1934, Serial No 739,958

1 Claim. (Cl. 301—122)

This invention relates to devices for coupling a rotatable member, as a wheel, knob or handle to an axle, shaft or spindle.

An object of the present invention is to provide means for the detachable engagement of one element, as the hub of a wheel, or a journal box, with another element, as a shaft, in a manner permitting relative rotary movement and preventing sliding or endwise movement.

A further feature is in the provision of a simple but effective coupling device for this purpose, that is symmetrical and of pleasing appearance, inexpensive to manufacture, easily applied and quickly removed when separation of the parts are required.

Another purpose is in the production of a coupling for connecting a wheel or the like, on the end portion of a shaft, in which no springs, set screws, cotter pins or other objectional elements are used.

These advantageous objects are attained by the novel construction and arrangement of parts hereinafter described and illustrated in the accompanying drawing, constituting an essential component of this disclosure, and in which:—

Figure 1 is a fragmentary partial side elevational, partial longitudinal sectional view of an embodiment of the invention.

Figure 2 is a transverse sectional view taken on line 2—2 of Figure 1.

Figure 3 is a view similar to Figure 1 but showing a modified construction.

Figure 4 is a transverse sectional view taken on line 4—4 of Figure 3.

As an example of one of the many uses to which the invention is applicable, a small cart, for instance, a baby coach has been selected and shown as having an axle 15, its end portions 16 adapted to be received in the hubs 17 of a conventional type of wheel.

Obviously, it is important that the wheels are freely rotatable on the axle, that they are safely secured on it in order to avoid accidents, and that the wheels can be removed at will to permit of inspection, lubrication and possible repairs.

Preferably the hub 17 is provided with a closure 18 at the outer end of the bore 19 to retain lubrication and exclude dust; it will be understood that any preferred type of bearing may be used.

At the inner end of the hubs 17 are cylindrical extensions 20 having screw threads 21 on their exterior and provided at their inner faces with sharply angled V shaped radial teeth 22.

Engageable with these teeth are similar teeth 23, formed on the adjacent ends of split bushings or collars 24, fitted to the axle and having inreaching annular flanges 25. The axle 15 has formed in it, at the inner end of the bearing portions 16, annular grooves 26 to receive the flanges 25 rotatably therein and the bushing is held on the axle by a sleeve nut 30, bored to fit the axle and having a counterbore 31 to envelope the bushing 24.

The counterbored portion of the sleeve 30 contains internal threads 32 suited to engage the hub extension threads 21, and the sleeve is provided with a knurled outstanding ring 33, or, if preferred, the ring may be suited to receive a wrench.

It will now be apparent that when the split bushing is assembled on the axle with the flanges or lugs 25 in the groove 26, and the sleeve nut turned tightly on the wheel hub threads, the teeth 22 and 23 form a lock, causing the bushing and sleeve nut to rotate as a unit with the wheel.

The flanges 25 in the groove of the axle tend to retain lubricating material in the bearing and obviously prevent end movement of the unit on the axle.

In the modification shown in Figure 3, the split bushing 24', in place of inreaching flanges, is provided with radial inreaching pins 25' adapted to engage the grooves of the axle.

It will be manifest that the device may be appropriately applied to door knobs, skate wheels and many other purposes by minor modifications, and that such embodiments are of the same effective type as has been described; it will also be apparent that the conditions can be reversed, that is to say the axle or shaft may revolve and the hub, together with its fittings, arranged to constitute a journal box or bearing, all of which is considered to be clearly within the scope of the claim hereto appended.

Having thus described the invention, what is claimed as new and sought to secure by Letters Patent, is:—

In combination, a spindle of uniform diameter having a single annular groove at a distance from its end, a hub fitted to rotate on said spindle outwardly beyond the groove, said hub being screw threaded on its outer surface at the inner end and having a plurality of acute angled radial teeth on its inner end surface, a bushing fitting said spindle, said bushing being composed of two equal longitudinal sections presenting a uniform smooth surfaced cylinder and having teeth on its outer end corresponding with and adapted to engage the teeth of said hub at any point of application thereto, means carried by said bushing to engage within the spindle groove, a sleeve chambered to receive said bushing and having threads at one end to engage the threads of said hub, and an annular inreaching flange at the opposite end of said sleeve to draw the teeth of said bushing and hub into positive engagement whereby said hub, bushing and sleeve operate as a unit relative to said spindle.

HARRY E. McKEE.